(12) United States Patent
Guidry et al.

(10) Patent No.: US 7,108,091 B2
(45) Date of Patent: Sep. 19, 2006

(54) SMALL VEHICLE WITH FUEL CELL THAT HAS ELEMENTS COOLED BY VENTILATION SYSTEM

(75) Inventors: Michael Guidry, Cypress, CA (US); Masatoshi Takeshita, Iwata (JP); Misato Kobayashi, Iwata (JP); Shuhei Adachi, Iwata (JP)

(73) Assignee: Yamaha Hatsudoki Kabushiki Kaisha, (JP)

( * ) Notice: Subject to any disclaimer, the term of this patent is extended or adjusted under 35 U.S.C. 154(b) by 223 days.

(21) Appl. No.: 10/726,242

(22) Filed: Dec. 2, 2003

(65) Prior Publication Data

US 2004/0108150 A1 Jun. 10, 2004

Related U.S. Application Data

(60) Provisional application No. 60/430,190, filed on Dec. 2, 2002.

(51) Int. Cl.
*B60K 11/06* (2006.01)

(52) U.S. Cl. .................... 180/68.1; 180/65.3
(58) Field of Classification Search ........... None
See application file for complete search history.

(56) References Cited

U.S. PATENT DOCUMENTS

| | | | |
|---|---|---|---|
| 4,267,895 A * | 5/1981 | Eggert, Jr. ............. | 180/68.1 |
| 4,660,854 A | 4/1987 | Suzuki et al. | |
| 5,016,725 A | 5/1991 | Muramatsu | |
| 5,082,075 A * | 1/1992 | Karolek et al. .......... | 180/68.2 |
| 5,086,858 A * | 2/1992 | Mizuta et al. .......... | 180/68.3 |
| 5,094,313 A * | 3/1992 | Mauws ................. | 180/210 |
| 5,193,635 A * | 3/1993 | Mizuno et al. .......... | 180/65.3 |
| 5,301,767 A | 4/1994 | Shiohara | |
| 5,320,190 A * | 6/1994 | Naumann et al. ........ | 180/68.2 |
| 5,575,352 A | 11/1996 | Suzuki et al. | |
| 5,577,570 A | 11/1996 | Shiohara et al. | |
| 5,620,217 A | 4/1997 | Ichikawa et al. | |
| 5,641,031 A * | 6/1997 | Riemer et al. .......... | 180/65.3 |
| 5,899,778 A | 5/1999 | Hiraoka et al. | |
| 6,076,624 A | 6/2000 | Izumi et al. | |

(Continued)

OTHER PUBLICATIONS

Co-Pending U.S. Appl. No. 10/726,255, filed Dec. 2, 2003 in the name of Micheal Guidry et al.

*Primary Examiner*—Christopher P. Ellis
*Assistant Examiner*—Christopher Bottorff
(74) *Attorney, Agent, or Firm*—Knobbe Martens Olson & Bear LLP

(57) ABSTRACT

An electric motor-driven vehicle comprises a seat disposed centrally on a vehicle body, a loading platform located over a loading platform receiving frame and behind the seat, and a plurality of main frame rails connected to the loading platform receiving frame. The vehicle further comprises a fuel supply piping system, at least one battery, a fuel cell and at least one fuel tank. A plurality of air intake openings are formed on the vehicle body in front of the fuel cell and the at least one battery. The plurality of air intake openings are configured to receive at least part of the air caused to flow rearward by the propulsion of the vehicle to cool the fuel cell and the at least one battery. The fuel cell optionally comprises a fan and is optionally disposed in a fuel cell holder having lateral ends that define openings. The fan is configured to draw at least part of the air caused to flow rearward by the propulsion of the vehicle through the openings on the fuel cell holder to cool the fuel cell.

8 Claims, 22 Drawing Sheets

U.S. PATENT DOCUMENTS

| | | | |
|---|---|---|---|
| 6,260,644 B1 * | 7/2001 | Otsu ........................ | 180/65.3 |
| 6,378,637 B1 * | 4/2002 | Ono et al. ................. | 180/65.3 |
| 6,390,215 B1 * | 5/2002 | Kodama et al. ........... | 180/65.3 |
| 6,448,535 B1 | 9/2002 | Ap | |
| 6,517,111 B1 * | 2/2003 | Mizuta ....................... | 280/756 |
| 6,598,691 B1 * | 7/2003 | Mita et al. ................. | 180/65.1 |
| 6,902,020 B1 * | 6/2005 | Kronner et al. ............ | 180/68.5 |
| 6,923,282 B1 * | 8/2005 | Chernoff et al. ........... | 180/65.3 |

\* cited by examiner

SMALL VEHICLE WITH FUEL CELL THAT HAS ELEMENTS COOLED BY VENTILATION SYSTEM

RELATED CASES

This application is based on and claims priority to U.S. Provisional Application No. 60/430,190 filed Dec. 2, 2002, the entire contents of which are hereby incorporated by reference.

BACKGROUND OF THE INVENTION

1. Field of the Invention

The invention is directed at an electric motor-operated vehicle using a fuel cell. Specifically, the invention relates to the layout of cooling elements associated with the fuel cell of an electric motor-operated vehicle.

2. Description of the Related Art

Electric motor-operated vehicles having fuel cells are well known in the art. Some of such conventional electric motor-operated vehicles are golf carts or other simple vehicles for carrying objects.

The fuel cell is generally a generator that converts chemical energy, released when water is produced by the reaction of hydrogen and oxygen, into electric energy that can be used in conjunction with a battery and an electric motor to propel an electric vehicle. Fuel cells such as the solid polymer electrolyte fuel cell (PEFC) that is in practical use is capable of generating electricity at a low working temperature of about 70 to 90 degrees Celsius using an ion exchange membrane as the electrolyte, and hydrogen, natural gas or gasoline as the fuel.

A by-product of the electricity generation process of a fuel cell is heat, which can be dissipated with a variety of devices. Components related to the electricity generation process must be effectively cooled in order to generate electricity with high efficiency and reliability.

A conventional electric motor-operated vehicle with a conventional fuel cell is disclosed in U.S. Pat. No. 6,448,535. The cooling structure disclosed therein to cool the fuel cell comprises a heat exchanger, a cooling medium, and a fan to cool the cooling medium. However, the layout of the cooling structure is large, complicated and heavy.

SUMMARY OF THE INVENTION

As noted above, conventional electric motor-operated vehicles use a cooling structure with a layout that is large, complicated and heavy. Accordingly, one aspect of at least one embodiment of the present invention is the recognition that the fuel cell and related components in an electric motor-operated vehicle can be arranged so as to cool them in an efficient and uncomplicated manner. Therefore, in at least one embodiment of the present invention, the electric motor-operated vehicle employs a layout of the fuel cell and related components to cool them in an efficient and uncomplicated manner with airflow generated by the propulsion of the vehicle along a travel path.

DETAILED DESCRIPTION OF THE PREFERRED EMBODIMENT

Figure 1:
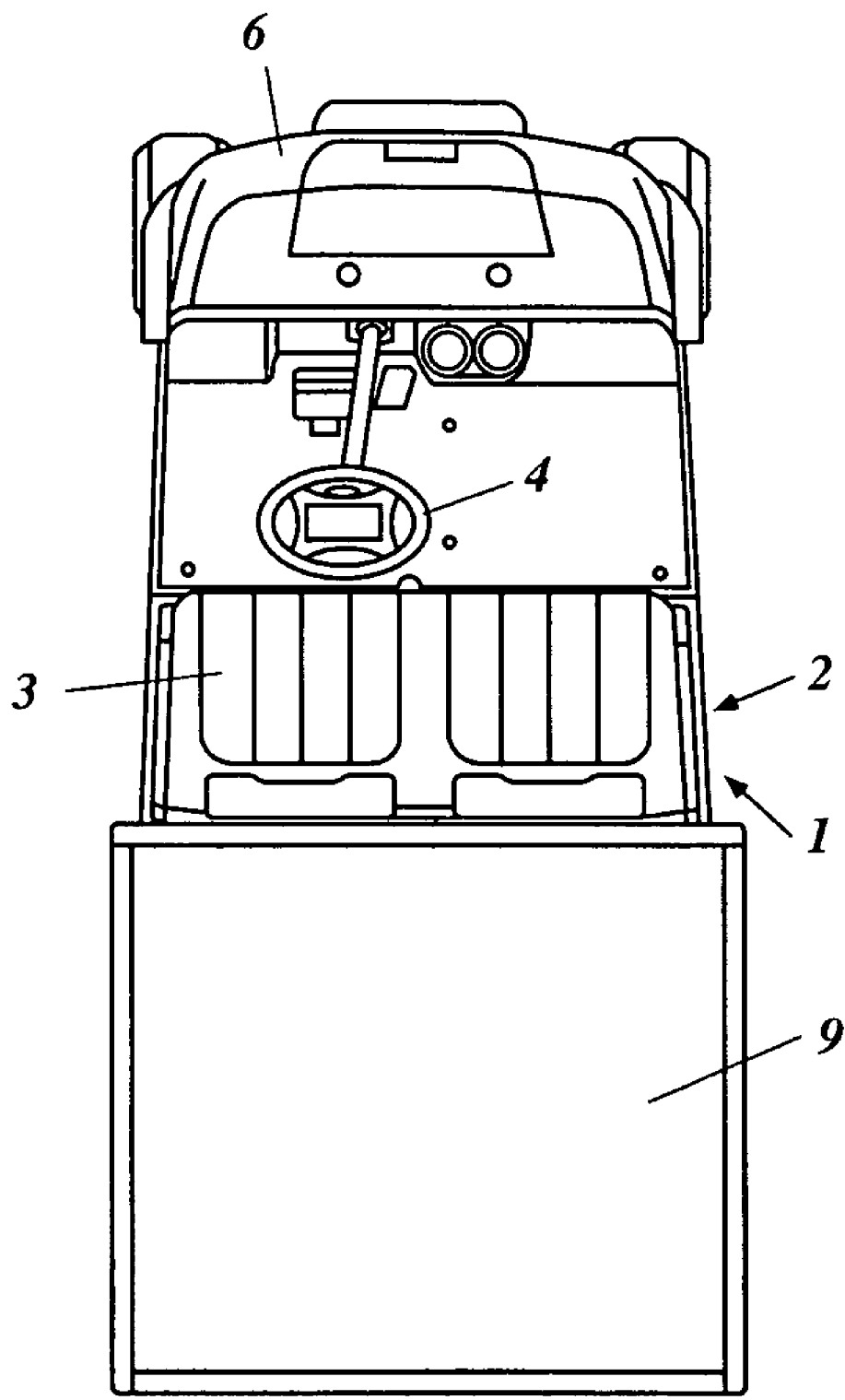
FIG. 1 is a top view of an electric motor-operated vehicle according to a preferred embodiment of the present invention.
Figure 2:
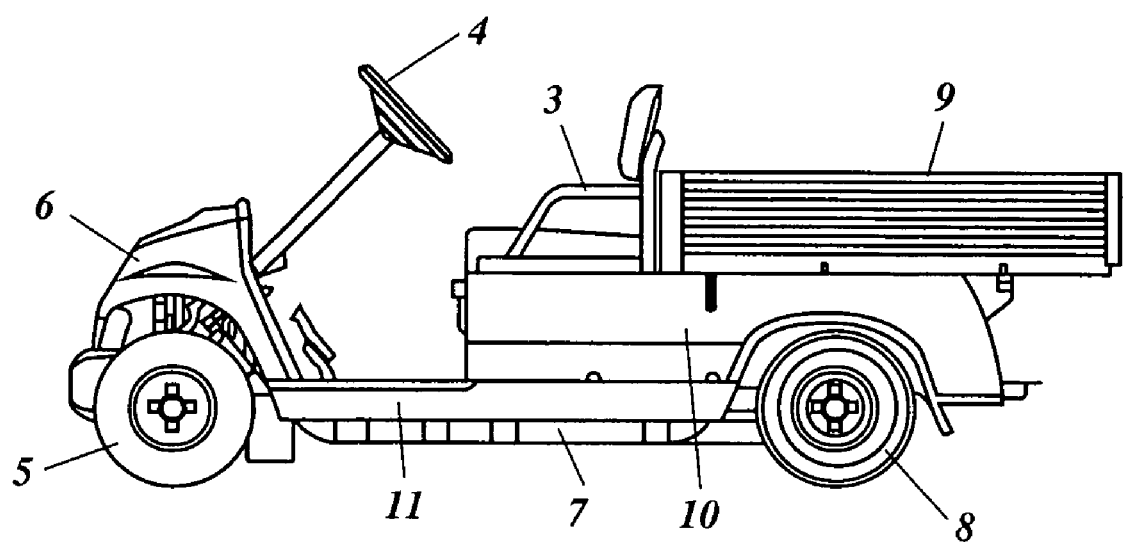
FIG. 2 is a side view of the electric motor-operated vehicle illustrated in FIG. 1, in accordance with a preferred embodiment of the present invention.
Figure 3:
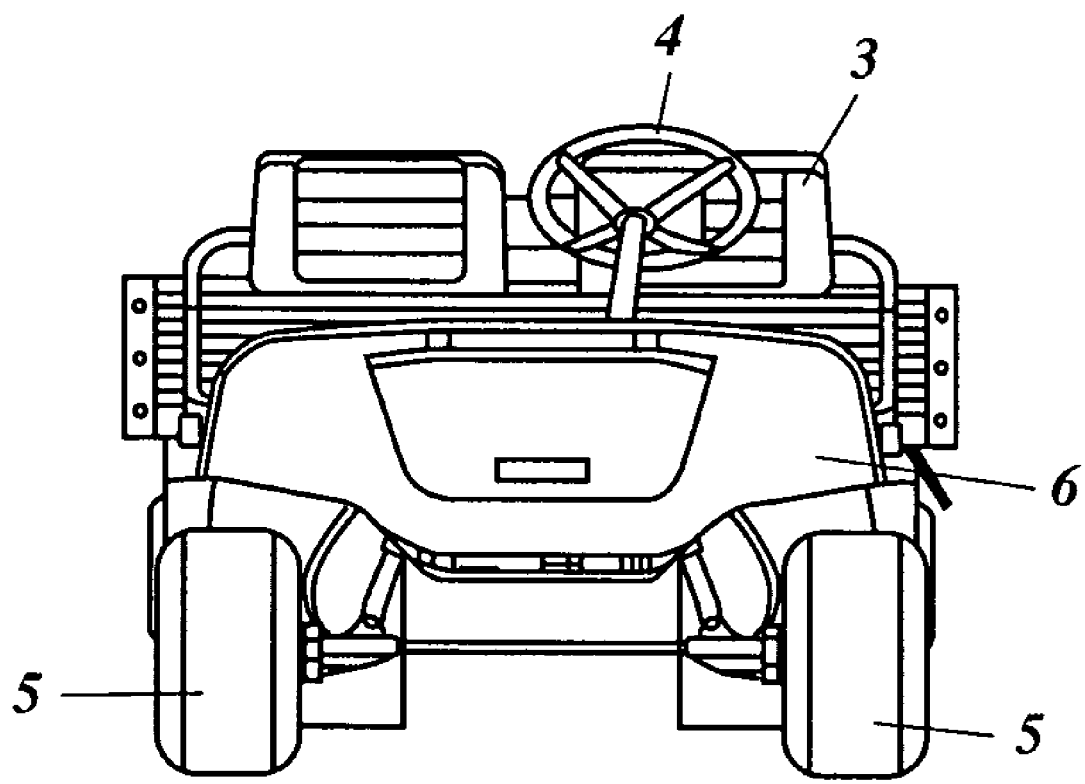
FIG. 3 is a front view of the electric motor-operated vehicle illustrated in FIG. 1, in accordance with a preferred embodiment of the present invention.
Figure 4:
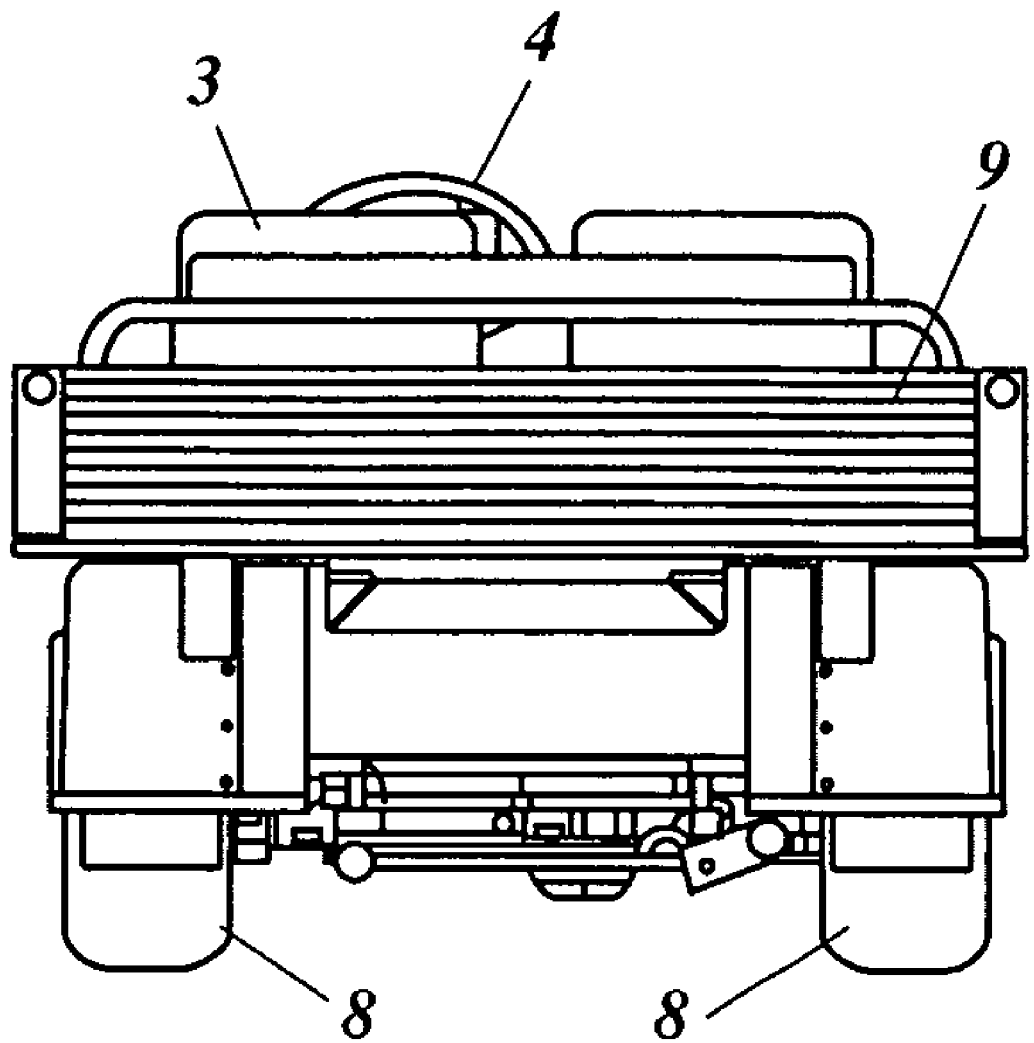
FIG. 4 is a rear view of the electric motor-operated vehicle illustrated in FIG. 1, in accordance with a preferred embodiment of the present invention.

In the following description, reference is made to the accompanying drawings, which form a part hereof, and which show, by way of illustration, specific embodiments in which various aspects and features of the invention may be practiced. Where possible, the same reference numbers are used throughout the drawings and the following description to refer to the same or like components among the embodiments.

With reference to FIGS. 1 to 4, an electric motor-operated vehicle 1 generally comprises a vehicle body 2 having a front end, a rear end, a left side and a right side. The front and rear ends define a vehicle length along a longitudinal axis extending between the ends, while the right and left sides define a vehicle width along a transverse axis extending between the sides. As used herein, right, left, front, and rear are defined according to the perspective of a user operating the vehicle 1 and do not have any meaning independent of the user's perspective.

The vehicle 1 also comprises a plurality of wheels and at least one seat 3 disposed centrally along the vehicle length and vehicle width on the vehicle body 2. The at least one seat 3 preferably connects to the vehicle body 2. In the illustrated embodiment, the vehicle 1 comprises two seats 3. The vehicle 1 also comprises a steering wheel 4 disposed in front of the seat 3. In the illustrated embodiment, the plurality of wheels includes two front wheels 5 connected to each other by an axle (not shown) and disposed beneath the vehicle body 2. A front cowl 6 covers a space above the front wheels 5, the cowl 6 preferably having a depressed central surface.

The vehicle 1 further comprises a plurality of main frame rails 7 disposed beneath the vehicle body 2, and extending from the front end to the rear end of the vehicle body 2. In the illustrated embodiment, the plurality of main frame rails 7 comprises two rails 7 disposed at the right and left sides of the vehicle body 2. The main frame rails 7 are preferably made of pipe material having sufficient strength, such as, but without limitation, steel. In the illustrated embodiment, the plurality of wheels also includes two rear wheels 8 connected to each other by an axle (not shown) and disposed beneath the vehicle body 2. The vehicle also comprises a loading platform 9 configured to hold at least one object and a vehicle body cowl 10 disposed over the right and left sides of the vehicle body 2 and over a lower front side below the seat 3. Further, side frame rails 11 are disposed outside at least a portion of the main frame rails 7.

Figure 5:
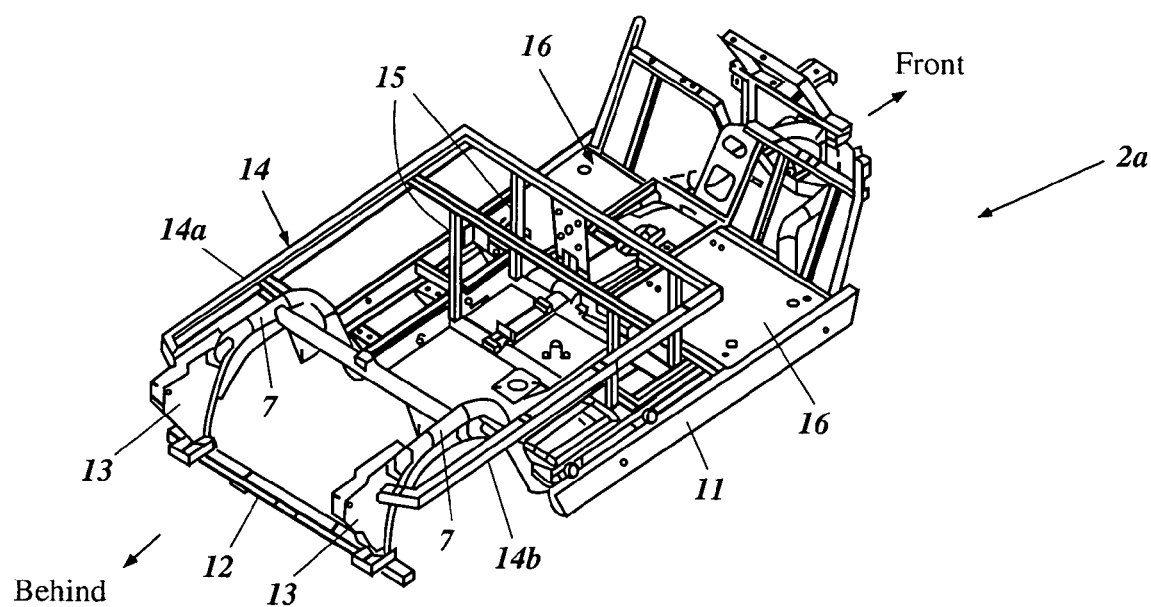
FIG. 5 is a perspective view of a vehicle body frame, in accordance with a preferred embodiment of the electric motor-operated vehicle.

With reference to FIG. 5, a vehicle body frame 2a in accordance with a preferred embodiment of the electric motor-operated vehicle is illustrated therein.

According to the illustrated embodiment, a cross member 12 connects the main frame rails 7 to each other at the rear end of the vehicle body frame 2a. Brackets 13 also connect to each main frame rail 7 at the rear end of the vehicle body frame 2a. A loading platform receiving frame 14, comprising a left side rail 14a and a right side rail 14b, is disposed above the side frame rails 11 and connects to the main frame rails 7. The side rails 14a, 14b also connect to the brackets 13. The loading platform receiving frame 14 is preferably a three-sided frame. Again, right side and left side are defined relative to the perspective of a user operating the vehicle 1, as described above. A plurality of struts 15 connect the main frame rails 7 to the loading platform receiving frame 14, and are configured to secure the receiving frame 14 to the main frame rails 7. The struts 15 preferably connect to a front portion and a middle portion of the receiving frame 14, as shown in the illustrated embodiment. At least one floor plate 16 is disposed in front of the receiving frame 14 over the main frame rails 7. In the illustrated embodiment, two floor plates 16 are shown.

Figure 6:
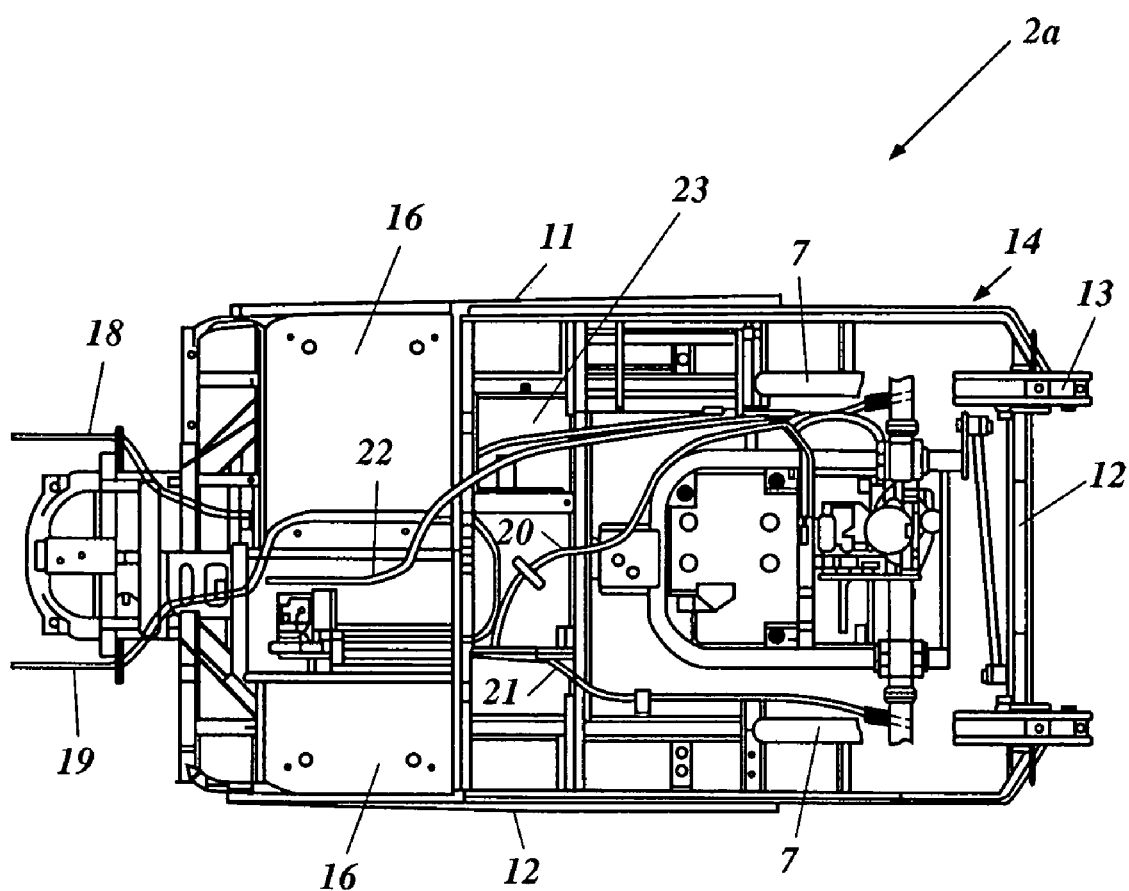
FIG. 6 is a top view of the vehicle body frame illustrating the routing of wires, in accordance with a preferred embodiment of the electric motor-operated vehicle.

With reference to FIG. 6, the routing of wires in a vehicle body frame 2a in accordance with a preferred embodiment of the electric motor-operated vehicle is illustrated therein.

A brake pedal 17 is disposed on the floor plate 16 toward the front of the vehicle body frame 2a. The brake pedal 17 connects to a right front wheel brake cable 18, a left front wheel brake cable 19, a right rear wheel brake cable 20 and a left rear wheel brake cable 21. The brake pedal 17 is configured to receive a brake force input from the user. The cables 18, 19, 20, 21 in turn connect, and are configured to transmit the brake force input, to a right front wheel (not shown), a left front wheel (not shown), a right rear wheel (not shown) and a left rear wheel (not shown), respectively.

An acceleration pedal (not shown) is also disposed on the front plate 16 toward the front of the vehicle body frame 2a. The acceleration pedal connects to a throttle cable 22 and is configured to receive a throttle input from the user. The throttle cable 22 connects to an electric motor (not shown) and is configured to transmit the throttle input from the acceleration pedal to the electric motor. A shift cable 23 is also disposed on the vehicle body frame 2a and is configured for use in switching the operation of the vehicle 1 between a forward and a reverse motion.

Figure 7:
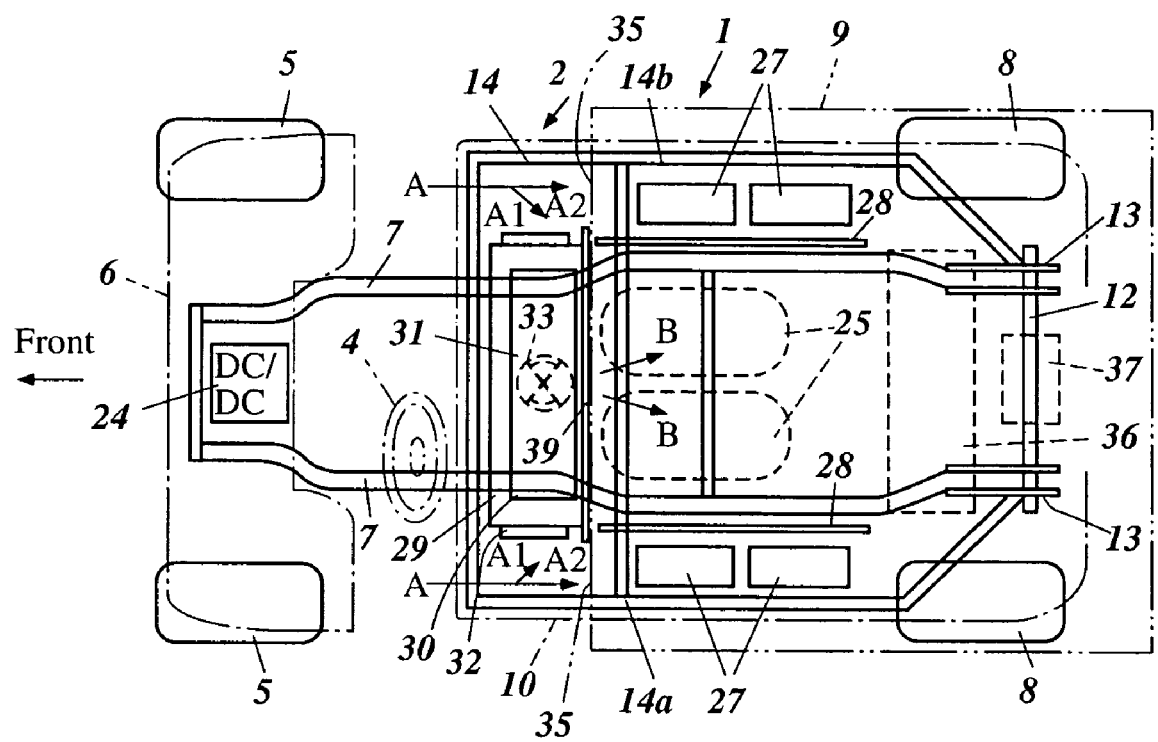
FIG. 7 is a top plan view of the layout of components, in accordance with a preferred embodiment of the electric motor-operated vehicle.
Figure 8:
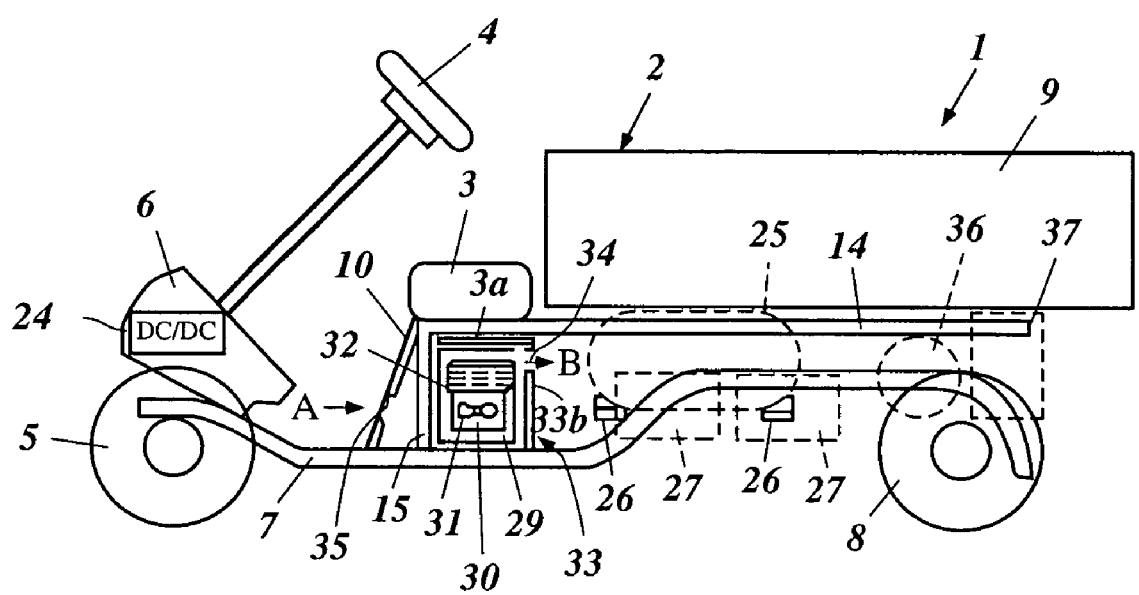
FIG. 8 is a side plan view of the layout of components, in accordance with a preferred embodiment of the electric motor-operated vehicle.

With reference to FIGS. 7 and 8, a layout of components, in accordance with a preferred embodiment of the electric motor-operated vehicle is illustrated therein.

An amplifier 24 is removably disposed on the front cowl 6 above the main frame rails 7, preferably on the depressed central surface of the front cowl 6. At least one fuel tank 25 is disposed behind the seat 3, preferably between a raised portion of the right and left main frame rails 7. The seat 3 is disposed above the loading platform receiving frame 14. In the illustrated embodiment, the at least one fuel tank 25 includes two hydrogen fuel tanks 25. The fuel tanks 25 have a front end and a rear end that define a longitudinal axis extending between the ends, and that face the front end and rear end of the vehicle body 2, respectively. The fuel tanks 25 are preferably oriented such that the longitudinal axis of the fuel tanks 25 is generally parallel to the longitudinal axis of the vehicle body 2. The fuel tanks 25 are also preferably removably mounted on a plurality of base seats 26, which are preferably disposed at the longitudinal ends of the fuel tanks 25. The base seats 26 can also optionally extend along the length of the fuel tanks 25. The base seats 26 are configured to receive and securely hold the fuel tanks 25, and to prevent the longitudinal and lateral displacement of the tanks 25.

The vehicle 1 comprises at least one battery 27. In the illustrated embodiment, four batteries 27 are shown. The batteries 27 are preferably disposed longitudinally on either side of the fuel tanks 25. Each battery 27 is removably mounted between the right or left side rails 14a, 14b of the loading platform receiving frame 14 and the fuel tanks 25.

At least one partition wall 28 is preferably disposed between the batteries 27 and the fuel tanks 25. Two partition walls 28 are shown in the illustrated embodiment. The partition walls 28 can be made, for example, but without limitation, of a plastic material, a steel sheet or other sheet metal. The partition walls 28 are configured to strengthen the vehicle body frame 2a, protect the fuel tanks 25, and protect and guide airflow to the batteries 27.

In the illustrated embodiment, a fuel cell holder 29 is disposed in front of the fuel tanks 25, under the seat 3, and over the main frame rails 7. The fuel cell holder 29 is further disposed under the loading platform receiving frame 14. The fuel cell holder has a right and left lateral end generally perpendicular to the longitudinal axis of the vehicle body 2 and is configured to receive and hold a fuel cell unit 30 removably disposed therein. The fuel cell unit 30 optionally comprises a fan 31, which is preferably disposed at the bottom of the fuel cell unit 30 and is configured to generate airflow over the fuel cell unit 30 to cool the unit 30. Each of the right and left lateral ends of the fuel cell holder 29 define an opening configured to receive a filter 32 and to allow air flow into the fuel cell holder 29. The filters 32 are removably connected to said openings.

Figure 9:
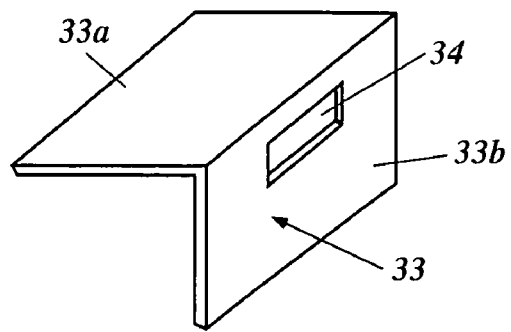
FIG. 9 is an oblique view of a partition wall, in accordance with the electric motor-operated vehicle illustrated in FIG. 7.

A partition wall 33 is disposed between the fuel cell holder 29 and the fuel tanks 25 and is configured to, among other things, protect the fuel cell unit 30 disposed thereunder. The partition wall 33 preferably has an inverted L-shape cross-section, as illustrated in FIG. 9. The partition wall 33 can be made, for example, but without limitation, of a plastic material, a steel sheet or other sheet metal. As illustrated in FIG. 9, the partition wall 33 comprises a top wall 33*a* and a vertical wall 33*b*. The partition wall 33 preferably also comprises a vent opening 34 formed on the upper central portion of the vertical wall 33*b*. The vent opening 34 is configured to allow airflow therethrough from the fuel cell holder 29.

Air intake openings 35 are formed on the vehicle body cowl 10 below the seat 3 and in front of the batteries 27. The intake openings 35 are configured to allow airflow, as illustrated by arrows A1 and A2 in FIG. 7, under the seat 3 and onto the batteries 27. Covers (not shown) are removably attached to the air intake openings 35. The covers can comprise, for example, but without limitation, a louver or labyrinth structure to prevent water or other foreign material from entering the intake openings 35.

An electric motor 36 configured to propel the vehicle 1 is disposed rearward of the fuel tanks 25 under the loading platform receiving frame 14. An electric motor control unit (MCU) 37 is disposed rearward of the electric motor 36, which advantageously decreases a thermal effect on the MCU 37 from the fuel cell unit 30. The MCU 37 is configured to control the operation of the electric motor 36.

Figure 10:
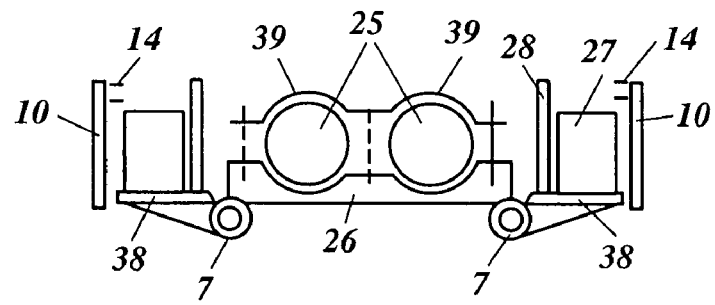
FIG. 10 is a cross-sectional view of the layout of batteries and fuel tanks, in accordance with the electric motor-operated vehicle illustrated in FIG. 7.

With reference to FIG. 10, a cross-section of the layout of the batteries 27 and fuel tank 25 in accordance with a preferred embodiment of the electric motor-operated vehicle is illustrated therein.

A plurality of receiving platforms 38 connect to and extend outward from the main frame rails 7. Each platform 38 defines a face generally parallel to a riding surface of the vehicle 1, and is configured to receive a battery 27 removably disposed thereon. Fittings 39 are removably and adjustably connected to the base seats 26 and configured to secure the fuel tanks 25 to the base seats 26.

Figure 11:
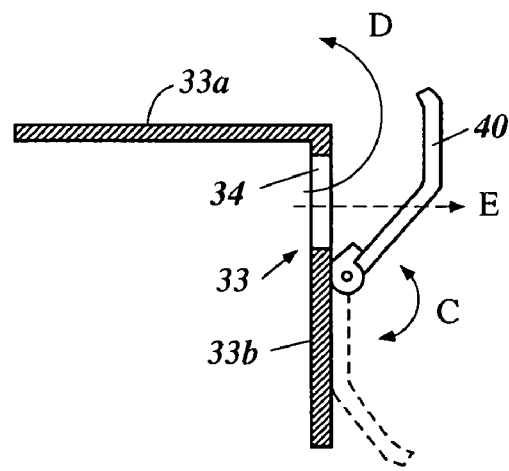
FIG. 11 is a cross-sectional view of a partition wall having a movable cover, in accordance with a preferred embodiment of the electric motor-operated vehicle.

With reference to FIG. 11, a modification to the partition wall 33 between the fuel cell holder 29 and the fuel tanks 25 is illustrated therein.

In the illustrated embodiment, a movable cover 40 is removably connected to the face of the vertical wall 33*b* that faces the fuel tanks 25, proximal to the vent opening 34. The movable cover 40 is configured to move in response to a force between an open position (dotted line) and a plurality of deflecting positions (solid line), as illustrated by arrow C. While in the open position, the airflow is directed straight toward the rear end of the vehicle body 2, as indicated by arrow E. Conversely, while in one of the plurality of deflecting positions, the movable cover 40 is configured to deflect the airflow passing through the vent opening 34 upward as indicated by arrow D.

During operation of the vehicle 1, airflow is generated by the propulsion of the vehicle along a travel path (not shown). The airflow flows over the depressed central surface of the front cowl 6 to effectively cool the amplifier 24 disposed thereon. Air also flows through the air intake openings 35 into the fuel cell holder 29 and onto the batteries 27.

Air is drawn at least partially by the fan 31 into the fuel cell holder 29, as indicated by arrow A1 in FIG. 7, to cool the fuel cell unit 30. If the movable cover 40 is in the open position, air is discharged through the vent opening 34 toward the fuel tanks 25, as indicated by arrow B in FIG. 7 and arrow E in FIG. 11. If, however, the movable cover 40 is in one of the plurality of deflection positions, the airflow is directed upward toward the seat 3, as indicated by arrow D, to warm a rider, for example, while the vehicle is operated in cold weather.

Air also enters through the intake openings 35 disposed frontward of the batteries 27, as indicated by arrows A2 in FIG. 7, to effectively cool the batteries 27. The partition walls 28 guide the cool air over the batteries 27 and prevent the cool air from mixing with the warm air flowing through the vent opening 34 toward the fuel tanks 25 (see arrow B in FIG. 7 or E in FIG. 11).

The fuel cell 30, batteries 27, and fuel tanks 25 are surrounded by the loading platform receiving frame 14, which provides sufficient protection from external forces. Positioning the batteries 27 on both sides of the fuel tanks at the right and left sides of the vehicle body 2 advantageously enhances weight balance and simplifies maintenance of the batteries 27. Additionally, the partition walls 28 between the fuel tanks 25 and the batteries 27 advantageously reinforce the vehicle body frame 2*a* and protect the fuel tanks 25. Similarly, the partition wall 33 between the fuel cell holder 29 and the fuel tanks 25 reinforces the vehicle body frame 2*a* and protects the fuel cell unit 30 and the fuel tanks 25.

Figure 12A:
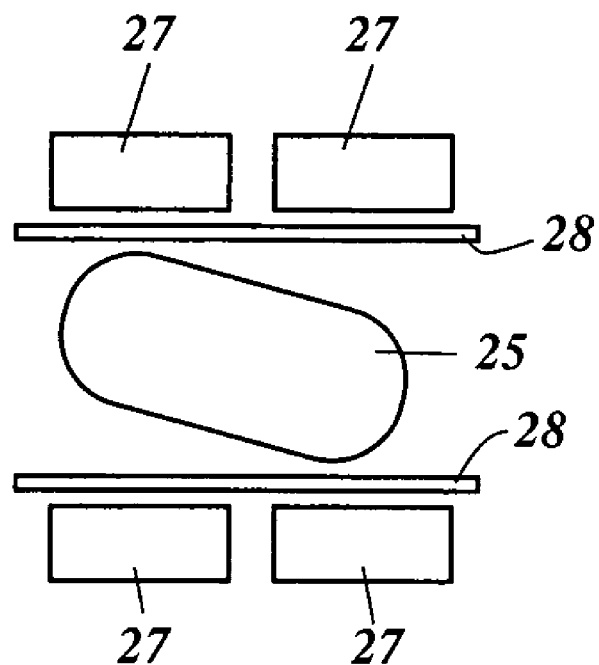
FIG. 12a is a top plan view of a layout of a fuel tank and batteries, in accordance with another embodiment of the electric motor-operated vehicle.
Figure 12B:
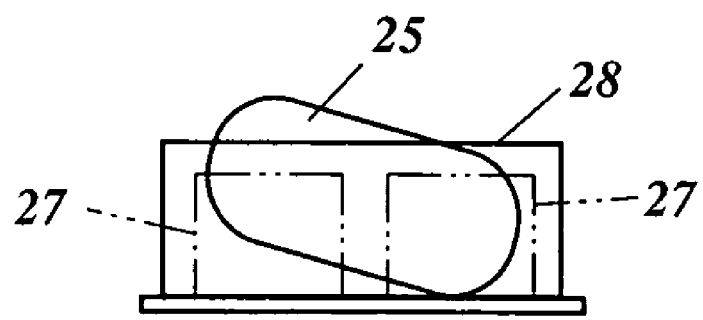
FIG. 12b is a side plan view of a layout of a fuel tank and batteries, in accordance with another embodiment of the electric motor-operated vehicle.

With respect to FIGS. 12*a* and 12*b*, other layouts of the fuel tanks 25 in accordance with other embodiments of the electric motor-operated vehicle are illustrated therein.

As illustrated in the top plan view of FIG. 12*a*, the fuel tanks 25 can be oriented such that the longitudinal axis of the fuel tanks 25 are at an angle to the longitudinal axis of the vehicle body 2 while the fuel tanks 25 remain parallel to the riding surface of the vehicle 1. The fuel tanks 25 can also be inclined at an angle relative to the riding surface of the vehicle 1, as shown in FIG. 12*b*.

Orientation of the fuel tanks 25 parallel to the longitudinal axis of the vehicle body 2 results in efficient use of the internal space of the vehicle body 2, and allows an increased number of fuel tanks 25 to fit on the vehicle body 2. An overall increase in fuel tank 25 capacity is thus achieved. Alternatively, orientation of the fuel tanks 25 at an angle to the longitudinal axis of the vehicle body 2 allows a per tank increase in fuel tank 25 capacity.

Figure 13:
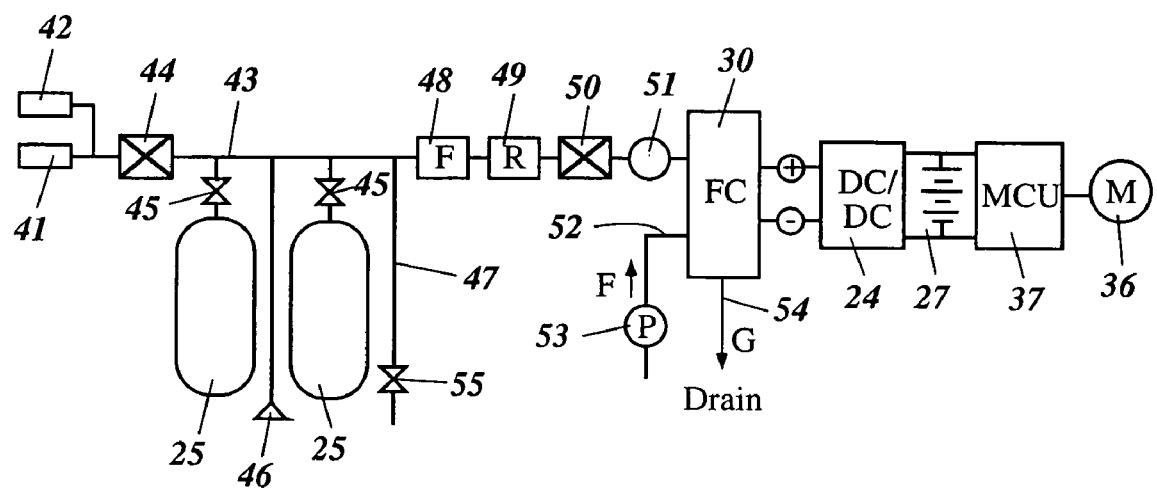
FIG. 13 is a diagram of a piping system, in accordance with a preferred embodiment of the electric motor-operated vehicle.

With reference to FIG. 13, a piping system in accordance with the preferred embodiment of the electric motor-operated vehicle is illustrated therein.

A first and second fuel supply port 41, 42 are disposed at one end of a fuel pipe 43 and removably connected to the pipe 43. The fuel pipe 43 can be made, for example, but without limitation, of steel or another metal. Each of the fuel supply ports 41, 42 comprises a check valve (not shown). The ports 41, 42 are configured to connect to a fuel supply (not shown) to introduce fuel into the fuel pipe 43 through the ports 41, 42.

The fuel pipe 43 also connects to the fuel tanks 25 through a check valve 44 disposed inline with the pipe 43. A fuel supply inlet mechanism 45 connected to an inlet of each fuel tank 25 comprises a valve, which is preferably a manually operated valve. A relief pipe connects to and branches off from the fuel pipe 43, preferably between the fuel tanks 25. The relief pipe connects to a relief valve 46 configured to provide pressure relief to the fuel pipe 43 and components connected to the fuel pipe 43. A fuel drawing pipe 47 connects to and branches off from the fuel pipe 43, preferably between the fuel tanks 25 and a fuel filter 48 disposed inline with the fuel pipe 43. The fuel filter 48 is disposed between the fuel tanks 25 and the fuel cell unit 30. A pressure regulator 49, a shut-off valve 50, and a flowmeter 51 are disposed inline with the fuel pipe 43 between the fuel filter 48 and the fuel cell unit 30. The shut-off valve 50 is preferably an automatic valve configured to open when the fuel cell unit 30 operates, and configured to close when the fuel cell unit 30 is not in use or under abnormal conditions, such as, but not limited to, low pressure. The fuel pipe 43 connects the flowmeter 51 to the fuel cell unit 30.

The fuel cell unit 30 receives air through an air supply pipe 52 connected to the fuel cell unit 30. An air pump 53, preferably disposed inline with the air supply pipe 52, pumps air into the fuel cell unit 30, as indicated by arrow F. A drainpipe 54 also connects to the fuel cell unit 30 and is configured to drain water produced by the fuel cell unit 30, as indicated by arrow G, during operation of the fuel cell unit 30. The fuel cell unit 30 connects to the amplifier 24, which is configured to step-up the DC voltage generated by the fuel cell unit 30. The amplifier 24 connects to the batteries 27 to supply the voltage generated by the fuel cell unit 30, which the batteries then supply to the motor control unit 37 to control the operation of the electric motor 36.

Figure 14:
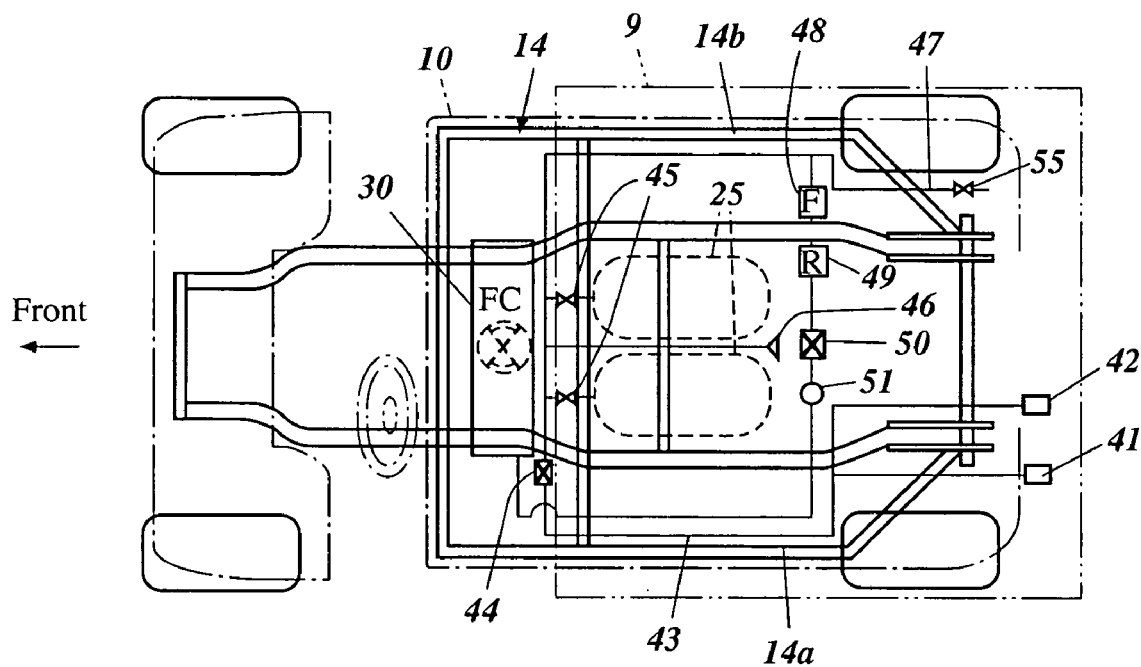
FIG. 14 is a top plan view of a layout of the piping system illustrated in FIG. 13, in accordance with a preferred embodiment of the electric motor-operated vehicle.
Figure 15:
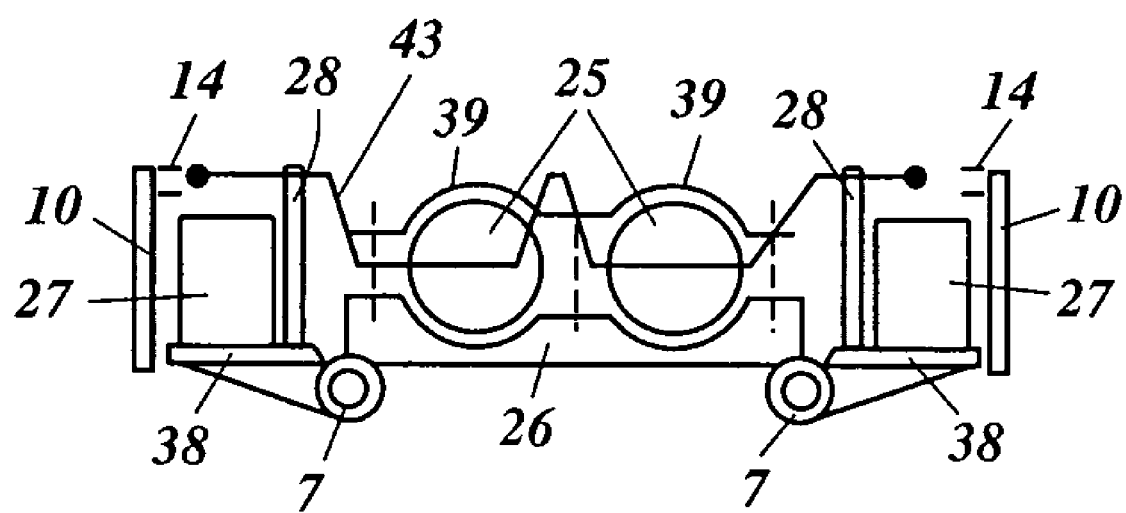
FIG. 15 is a cross-sectional view of the layout of the piping system illustrated in FIG. 13, in accordance with a preferred embodiment of the electric motor-operated vehicle.

With reference to FIGS. 14 and 15, the layout of the piping system on the vehicle body frame 2a in accordance with a preferred embodiment of the electric motor-operated vehicle is illustrated therein.

In the illustrated embodiment, the fuel supply ports 41, 42 are disposed rearward of the cross member 12 and below the loading platform 9. The fuel pipe 43 is disposed between the left and right side rails 14a, 14b of the loading platform receiving frame 14. The fuel pipe 43 preferably extends at least partially in a direction generally parallel to the side rails 14a, 14b and at least partially in a direction generally perpendicular to the side rails 14a, 14b so as to surround the fuel tanks 25 but maintain an adequate distance from the fuel tanks 25. The fuel supply inlet mechanism 45 of each fuel tank 25 faces the front end of the vehicle body 2.

As illustrated in FIG. 15, the layout of the fuel pipe 43 comprises a plurality of upward and downward bends. Such bends are configured to increase the flexibility of the piping system to absorb vibration and to secure the fuel pipe 43 to the vehicle body frame 2a in a stabilized manner.

Figure 16:
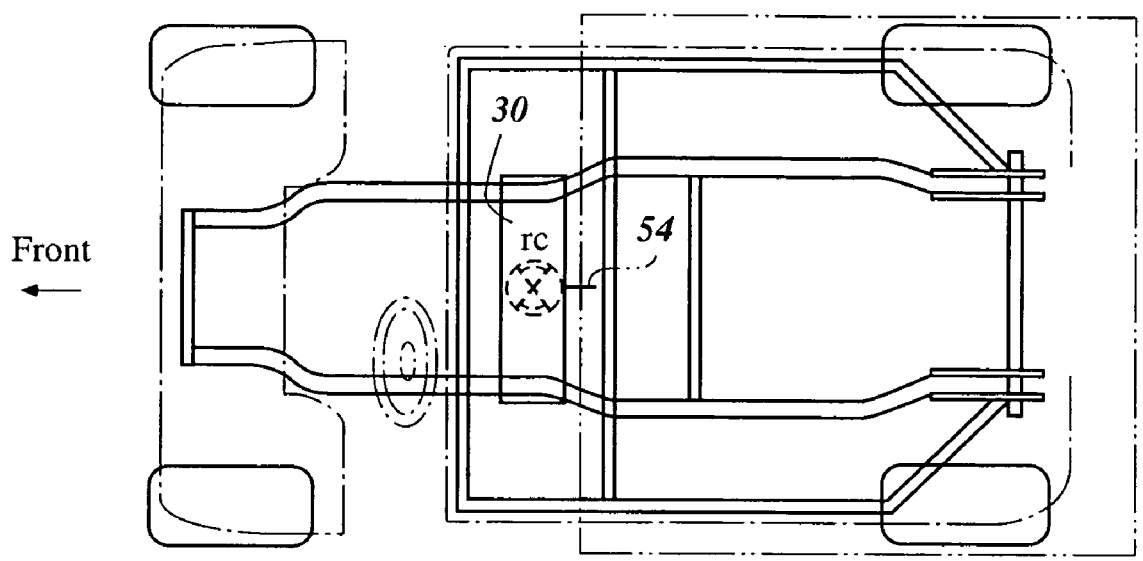
FIG. 16 is a top plan view of a fuel cell drainpipe, in accordance with a preferred embodiment of the electric motor-operated vehicle.
Figure 17:
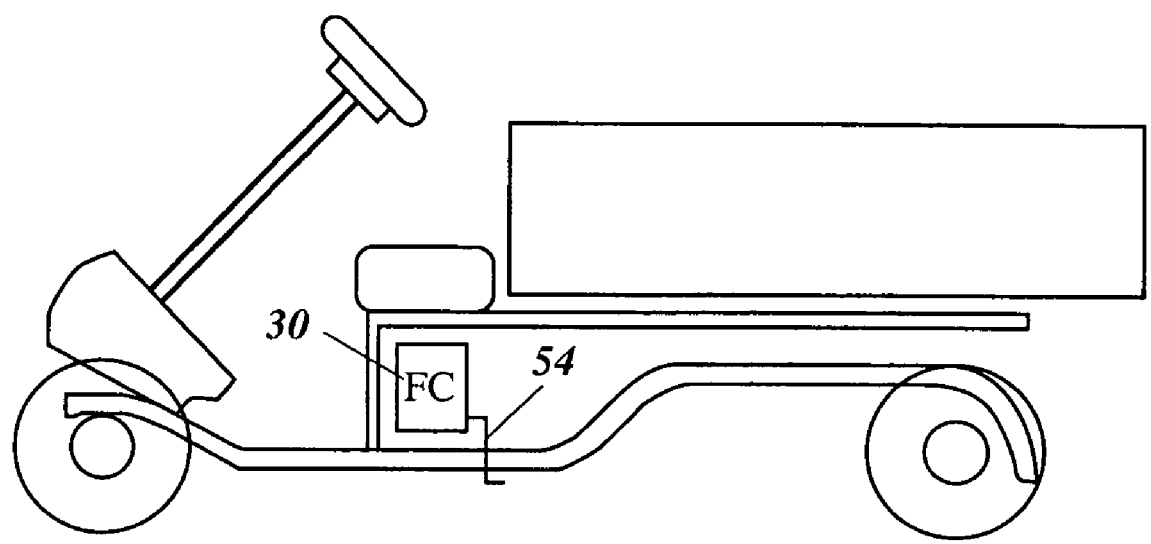
FIG. 17 is a side plan view of the fuel cell drainpipe illustrated in FIG. 16, in accordance with a preferred embodiment of the electric motor-operated vehicle.

With reference to FIGS. 16 and 17, the location of the fuel cell drainpipe 54 according to a preferred embodiment of the electric motor-operated vehicle is illustrated therein.

In the illustrated embodiment, the drainpipe 54 is disposed centrally along a longitudinal axis of the fuel cell unit 30, said longitudinal axis extending between lateral ends of the fuel cell unit 30. The drainpipe 54 extends rearward and downward from the fuel cell unit 30 and comprises a drain pipe 54 exit preferably disposed below the main frame rails 7. The drainpipe 54 can be made, for example, but without limitation, of a plastic material.

During operation of the vehicle 1, the fuel cell unit 30 receives fuel from the fuel tanks 25 through the fuel pipe 43. The fuel cell unit 30 also receives air through the air supply pipe 52. The fuel cell unit 30 generates electricity and water. The water is discharged at a central location beneath the vehicle body 2 through the drainpipe 54. The location of the drainpipe 54 advantageously allows water from the fuel cell unit 30 to be discharged between the plurality of wheels 5, 8. Accordingly, the wheels 5, 8 are less likely to run over the discharged water, resulting in a vehicle 1 that operates in a more stabilized manner. The amplifier 24 steps up the voltage generated by the fuel cell unit 30 before transmitting it to the battery 27 to charge the battery 27. The battery transmits power to the motor control unit 37, which controls the operation of the electric motor 36 to propel the vehicle 1. The fuel ports 41, 42 are advantageously disposed under the loading platform 9, which protects the ports 41, 42 from external forces.

Figure 18:
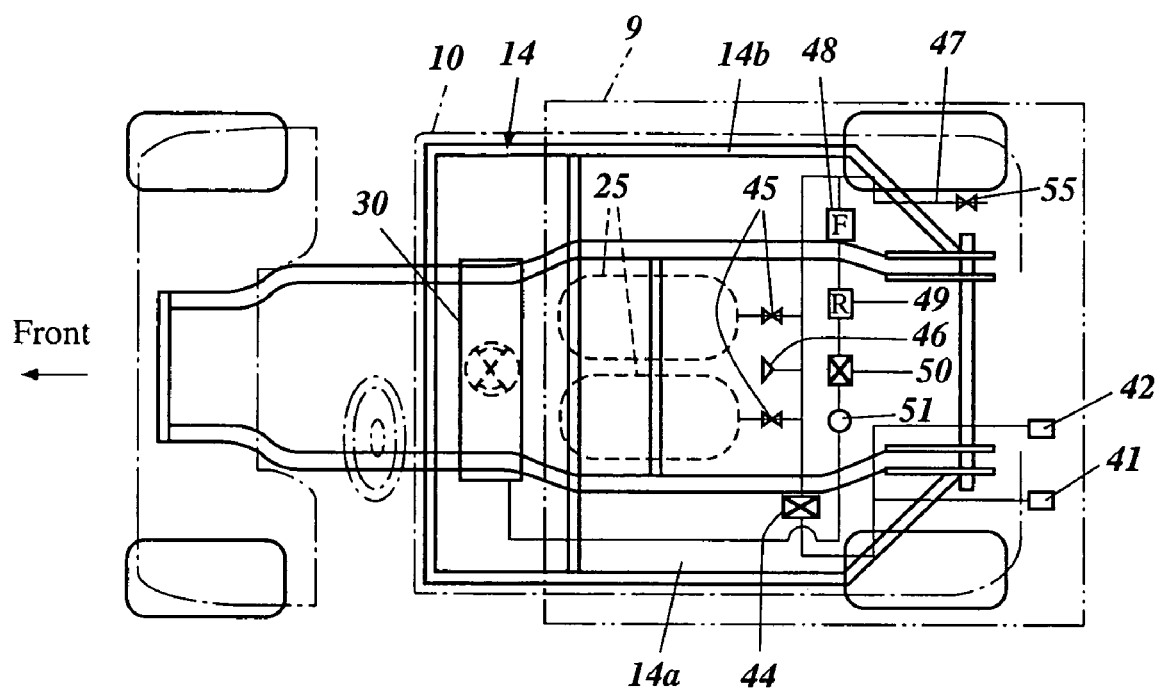
FIG. 18 is a top plan view of a layout of the piping system illustrated in FIG. 13, in accordance with a second preferred embodiment of the electric motor-operated vehicle.

With reference to FIG. 18, an alternate layout of the piping system in accordance with a second preferred embodiment of the electric motor-operated vehicle is illustrated therein.

In the illustrated embodiment, the fuel supply inlet mechanisms 45 of each fuel tank 25 faces the rear end of the vehicle body 2, so that the overall length of the fuel pipe 43 is shortened. The shortened fuel pipe 43 is configured to provide a smoother fuel flow. As discussed above, the fuel pipe 43 preferably extends at least partially in a direction generally parallel to the side rails 14a, 14b and at least partially in a direction generally perpendicular to the side rails 14a, 14b. The fuel pipe 43 also comprises a plurality of bends (not shown) configured to provide the fuel pipe 43 with flexibility for absorbing vibration, and to reduce flow resistance.

Figure 19:
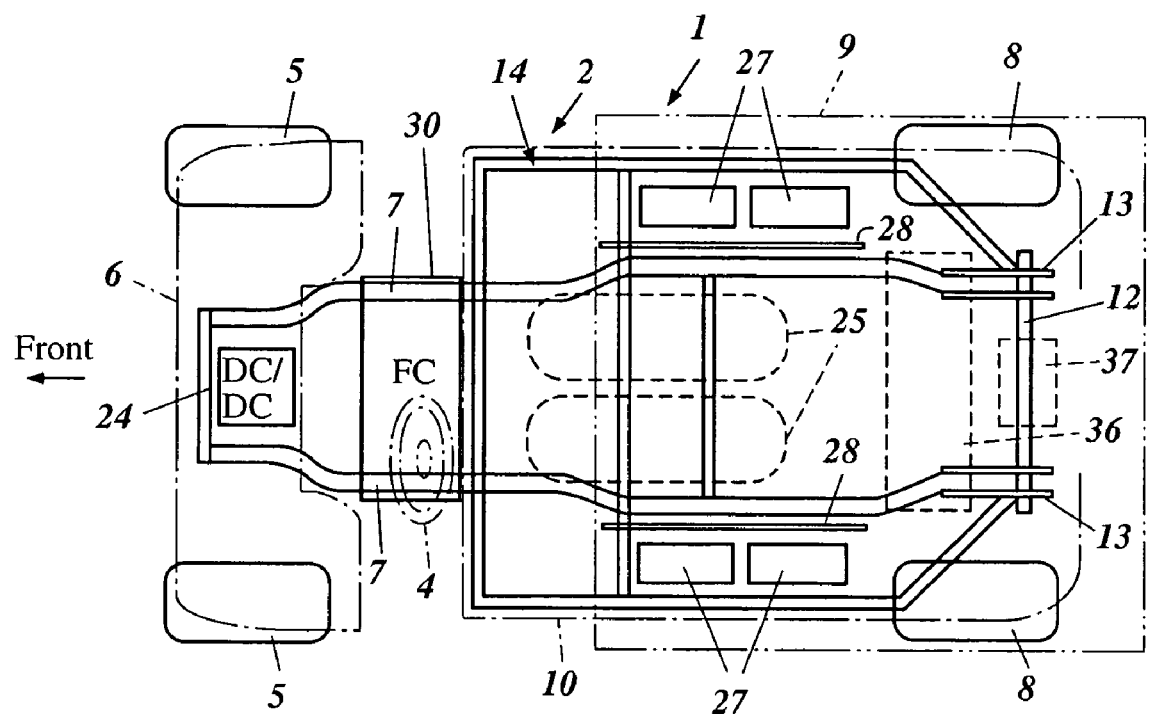
FIG. 19 is a top plan view of a third preferred embodiment of the electric motor-operated vehicle.
Figure 20:
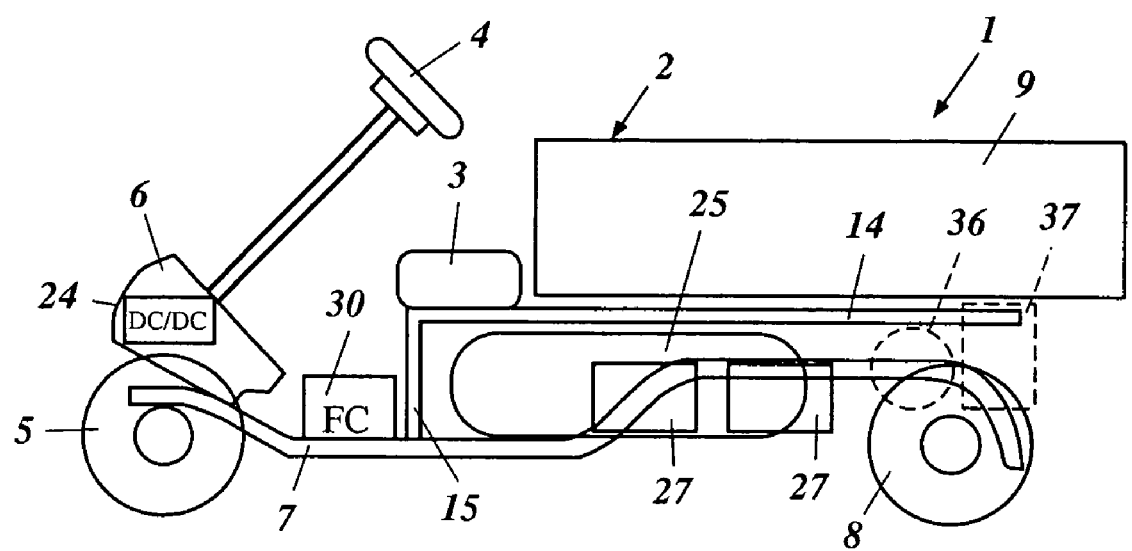
FIG. 20 is a side plan view of a third preferred embodiment of the electric motor-operated vehicle.

With reference to FIGS. 19 and 20, a layout of components in accordance with a third preferred embodiment of the electric motor-operated vehicle is illustrated therein.

In the illustrated embodiment, the fuel cell unit 30 is disposed in front of the seat 3. The front end of the fuel tanks 25 extends under the seat 3 so that the fuel tanks 25 can have a larger size with a greater fuel holding capacity. The increased fuel tank 25 capacity in the illustrated embodiment makes possible an increase in the travel range of the vehicle 1 per tank of fuel.

Figure 21:
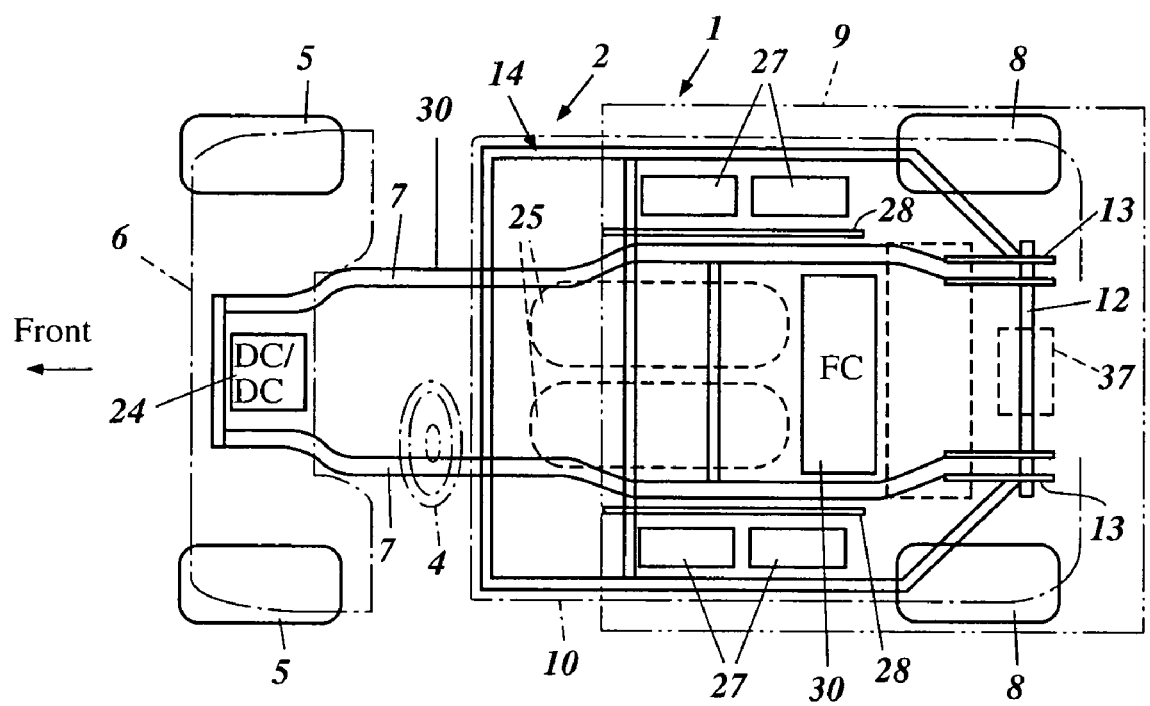
FIG. 21 is a top plan view of a fourth preferred embodiment of the electric motor-operated vehicle.
Figure 22:
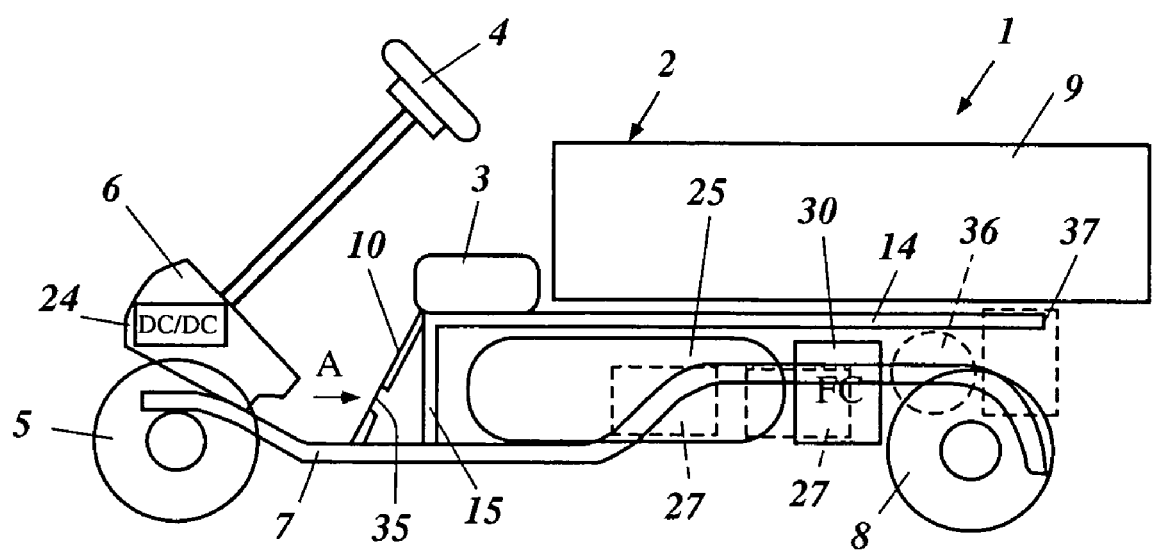
FIG. 22 is a side plan view of a fourth preferred embodiment of the electric motor-operated vehicle.

With reference to FIGS. 21 and 22, a layout of components in accordance with a fourth preferred embodiment of the electric motor-operated vehicle is illustrated therein.

In the illustrated embodiment, the fuel cell unit 30 is disposed between the fuel tanks 25 and the electric motor 36. The front end of the fuel tanks 25 extends under the seat 3 so that the fuel tanks 25 can have a larger size with a greater fuel holding capacity. The increased fuel tank 25 capacity in the illustrated embodiment makes possible an increase in the travel range of the vehicle 1 per tank of fuel.

Figure 23:
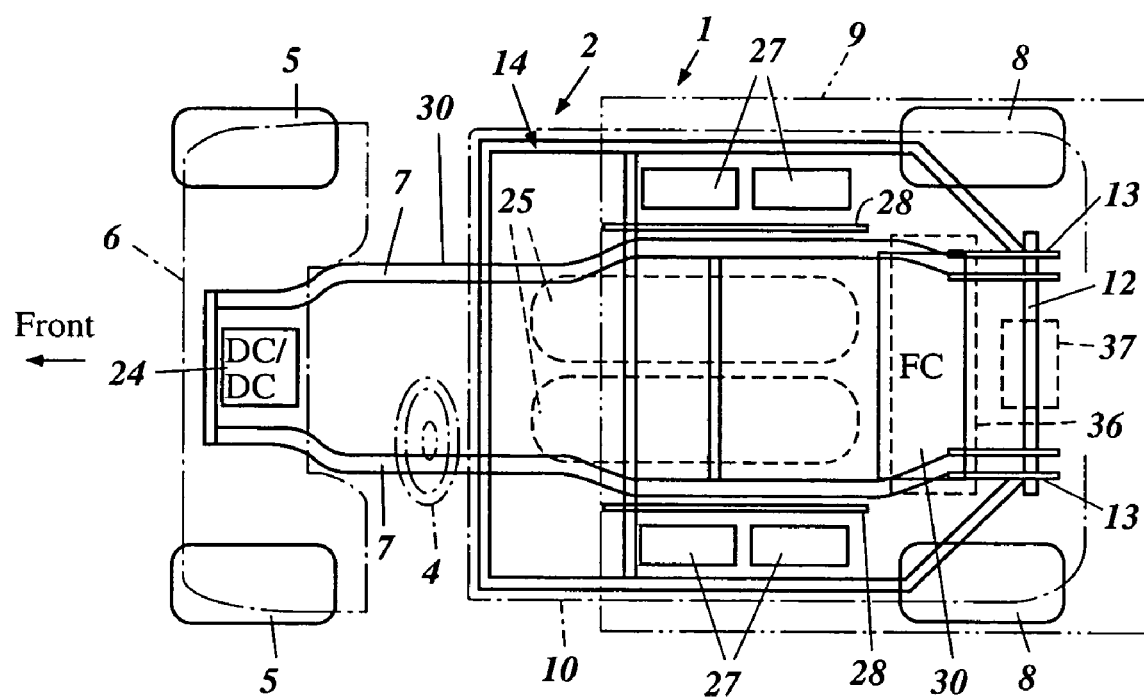
FIG. 23 is top plan view of a fifth preferred embodiment of the electric motor-operated vehicle.
Figure 24:
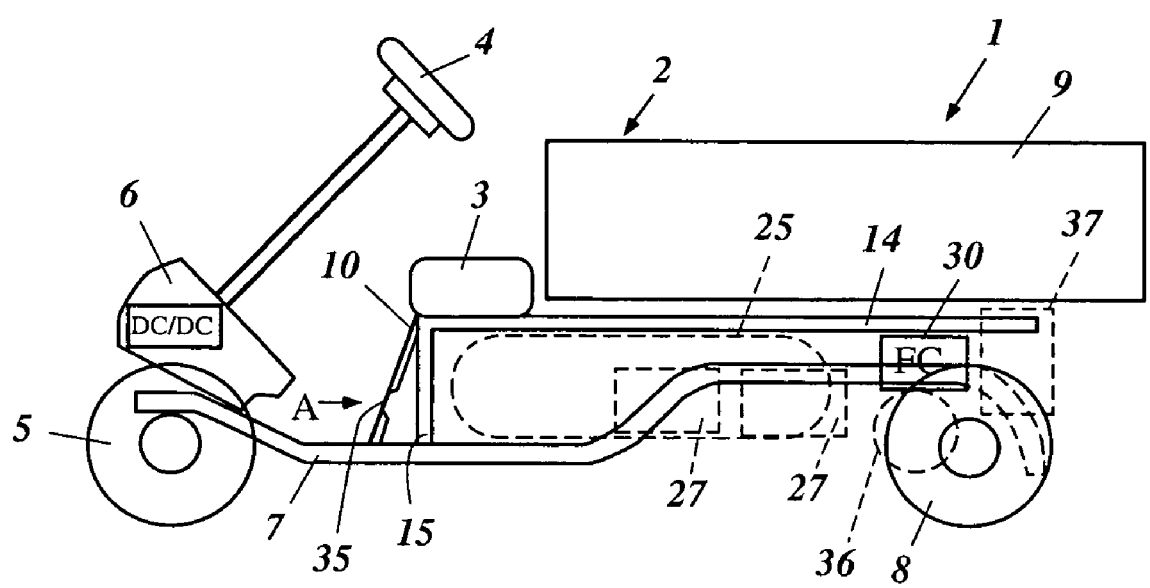
FIG. 24 is a side plan view of a fifth preferred embodiment of the electric motor-operated vehicle.

With reference to FIGS. 23 and 24, a layout of components in accordance with a fifth preferred embodiment of the electric motor-operated vehicle is illustrated therein.

In the illustrated embodiment, the fuel cell unit 30 is disposed between the fuel tanks 25 and the motor control unit 37, and above the electric motor 36. The front ends of the fuel tanks 25 extend under the seat 3 and the rear ends extend rearward so that the fuel tanks 25 can have an even larger size with an even greater fuel holding capacity. The increased fuel tank 25 capacity in the illustrated embodiment makes possible an increase in the travel range of the vehicle 1 per tank of fuel.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An electric motor-operated vehicle comprising:
   a plurality of wheels, wherein at least one of the plurality of wheels is a front wheel and at least one of the plurality of wheels is a rear wheel;
   a vehicle body defining a vehicle width extending along a transverse axis between a left side and a right side of said vehicle, and defining a vehicle length extending along a longitudinal axis between a front end and a rear end of said vehicle body;
   a seat connected to the vehicle body;
   a plurality of main frame rails disposed along the longitudinal axis of said vehicle body;
   a loading platform receiving frame connected to said plurality of main frame rails, the platform receiving frame comprising a right and a left side rail;
   a loading platform connected to said loading platform receiving frame, said loading platform disposed rearward of said seat above said rear wheel and configured to receive at least one object;
   an electric motor configured to drive the vehicle;
   at least one battery configured to supply power to said electric motor;
   a fuel cell configured to charge said at least one battery;
   at least one fuel tank configured to supply fuel to said fuel cell, said at least one fuel tank having a front end and a rear end defining a longitudinal axis extending between said front end and said rear end, said at least one fuel tank disposed centrally along said vehicle width, said fuel cell disposed between said front end of said at least one fuel tank and said front end of said vehicle body, said fuel cell further disposed beneath said seat;
   an electric motor control unit configured to control the operation of said electric motor,
   an air intake opening formed on the vehicle body frontward of said fuel cell, said air intake opening configured to receive at least part of an amount of air caused to flow rearward by a propulsion of said vehicle to cool said fuel cell; and
   a fuel cell holder, the fuel cell holder comprising
   at least one lateral end; and
   an opening defined by said at least one lateral end,
   said fuel cell removably disposed in said holder, said opening configured to receive at least part of an amount of air caused to flow rearward by a propulsion of said vehicle to cool said fuel cell.

2. The vehicle of claim 1, wherein the at least one lateral end faces generally perpendicular to said longitudinal axis of said vehicle body.

3. The vehicle of claim 1 further comprising:
   a partition wall having a vent opening on said wall, said partition wall disposed between said fuel cell and said at least one fuel tank; and
   a fan configured to cool said fuel cell,
   wherein said fan is configured to draw cooling air into said fuel cell holder and wherein said vent opening is configured to vent said cooling air rearward of said fuel cell.

4. The vehicle of claim 1, wherein air flows through a filter disposed at said at least one lateral end of said fuel cell holder.

5. The vehicle of claim 3, wherein said partition further comprises a movable cover configured to operate between an open position and a plurality of deflection positions to alter the direction of fluid flow through said vent opening, said cover further configured to move in response to a force.

6. An electric motor-operated vehicle comprising:
   a plurality of wheels, wherein at least one of the plurality of wheels is a front wheel and at least one of the plurality of wheels is a rear wheel;
   a vehicle body defining a vehicle width extending along a transverse axis between a left side and a right side of said vehicle, and defining a vehicle length extending along a longitudinal axis between a front end and a rear end of said vehicle body;
   a seat connected to the vehicle body;
   an electric motor configured to drive the vehicle;
   at least one battery configured to supply power to said electric motor;
   a fuel cell configured to charge said at least one battery;
   an air intake opening formed on the vehicle body frontward of said fuel cell, the air intake opening being configured to receive at least part of an amount of air caused to flow rearward by a propulsion of said vehicle to cool said fuel cell; and
   a fuel cell holder being open at least on an end thereof with the opening extending along an axis, the fuel cell removably disposed in said fuel cell holder, said fuel cell holder configured to receive therethrough at least part of an amount of air caused to flow rearward by a propulsion of said vehicle to cool said fuel cell.

7. The vehicle of claim 6 further comprising:
   a partition wall having a vent opening on said wall, said partition wall disposed between said fuel cell and at least one fuel tank; and
   a fan configured to cool said fuel cell,
   wherein said fan is configured to draw cooling air into said fuel cell holder and wherein said vent opening is configured to vent said cooling air rearward of said fuel cell.

8. The vehicle of claim 6, wherein air flows through a filter disposed at said end of said fuel cell holder.

* * * * *

UNITED STATES PATENT AND TRADEMARK OFFICE
CERTIFICATE OF CORRECTION

| | | |
|---|---|---|
| PATENT NO. | : 7,108,091 B2 | Page 1 of 1 |
| APPLICATION NO. | : 10/726242 | |
| DATED | : September 19, 2006 | |
| INVENTOR(S) | : Guidry et al. | |

It is certified that error appears in the above-identified patent and that said Letters Patent is hereby corrected as shown below:

On Title Page 2, in Column 2, Line 1, after "6,517,111" please replace "B1" with -- B2 --

On Title Page 2, in Column 2, Line 2, after "6,598,691" please replace "B1" with -- B2 --

On Title Page 2, in Column 2, Line 3, after "6,902,020" please replace "B1" with -- B2 --

On Title Page 2, in Column 2, Line 4, after "6,923,282" please replace "Bl" with -- B2 --

In Column 5, Line 3, after "holder" please insert -- 29 --

Signed and Sealed this

Fifteenth Day of May, 2007

JON W. DUDAS
*Director of the United States Patent and Trademark Office*